United States Patent [19]

Turner

[11] Patent Number: 4,635,107
[45] Date of Patent: Jan. 6, 1987

[54] ELECTRON BEAM POSITION CONTROL FOR COLOR DISPLAY

[75] Inventor: John A. Turner, Colchester, England

[73] Assignee: International Business Machines Corporation, Armonk, N.Y.

[21] Appl. No.: 642,222

[22] Filed: Aug. 20, 1984

[51] Int. Cl.$^4$ .............................................. H04N 9/24
[52] U.S. Cl. ........................................ 358/68; 358/64
[58] Field of Search .................. 358/68, 67, 69, 70, 358/64, 65, 66; 315/369, 10

[56] References Cited

U.S. PATENT DOCUMENTS

| | | | |
|---|---|---|---|
| 2,739,260 | 3/1956 | Lawrence | 313/470 |
| 2,885,594 | 5/1959 | Lesti | 358/65 X |
| 3,383,547 | 5/1968 | Alpers | 315/14 |
| 3,569,760 | 3/1971 | Fargher | 313/470 |
| 3,800,072 | 3/1974 | Lejon | 358/68 |

OTHER PUBLICATIONS

Turner, "An Electron Beam Indexing Color Display System", Oct. 1979.

Primary Examiner—James J. Groody
Assistant Examiner—E. Anne Toth
Attorney, Agent, or Firm—Thomas P. Dowd

[57] ABSTRACT

An electron beam position control arrangement for a color display cathode-ray tube, includes a series of spaced apart, parallel conductive strips on the faceplate or phosphor cooling of the CRT, the spaces between the strips defining a path along which an electron beam produced in the CRT is to be scanned. The electron beam is modulated with a pilot signal and, in the event the beam deviates along the predetermined path between the conductive strips, the pilot signal is detected as a result of the electron beam impinging on one of the strips by an amount greater than the beam impinges on an adjacent strip along the predetermined path, and the beam is returned to the predetermined path by position correction circuitry connected to beam deflection circuitry associated with the CRT. Such beam control arrangement allows for phosphors of different colors to lie between successive sets of the conductive strips, and for one or more electron beams to scan color phosphors to produce a color picture, without the use of a shadow mask or aperture grill in the CRT.

8 Claims, 7 Drawing Figures

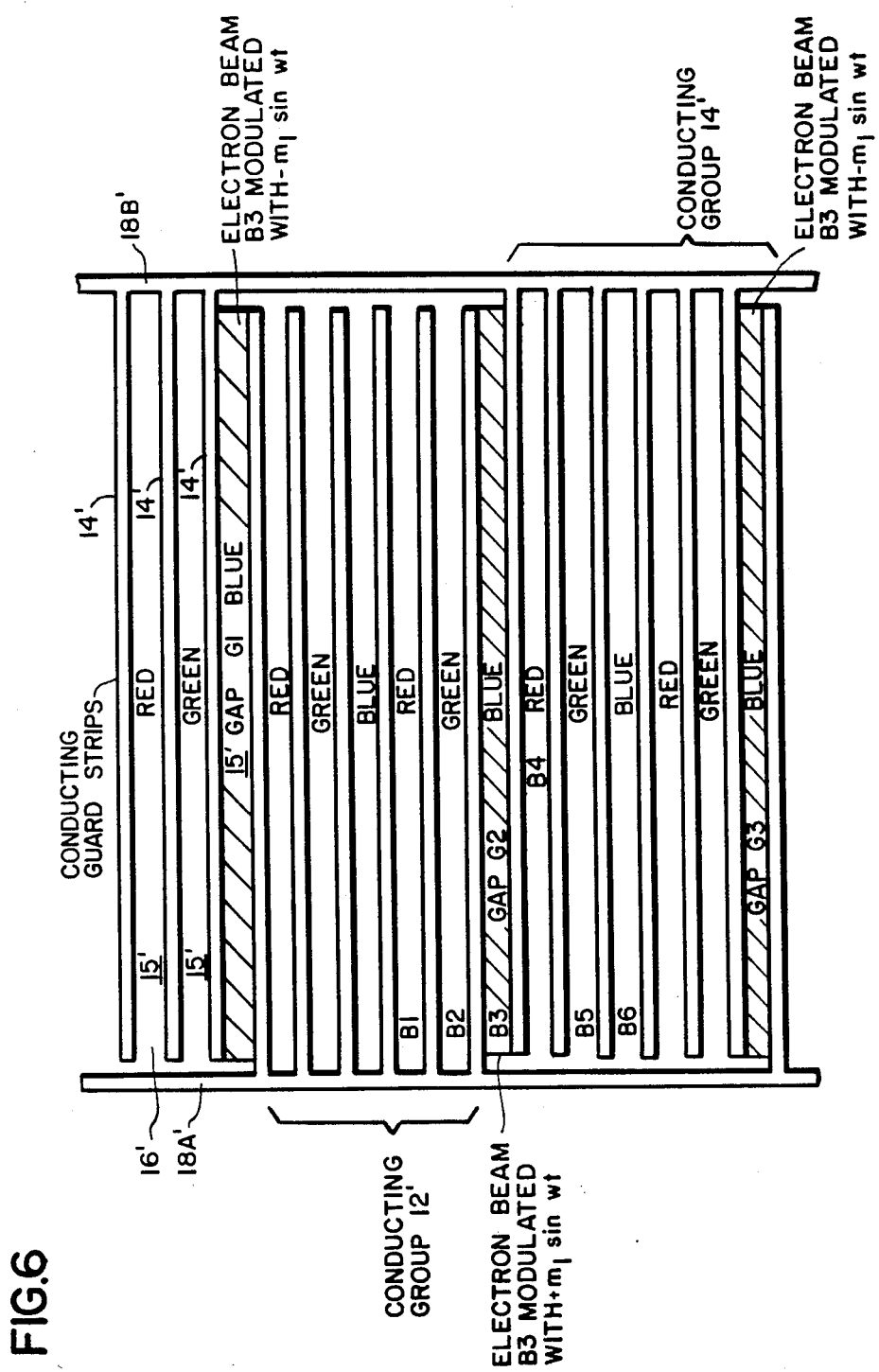

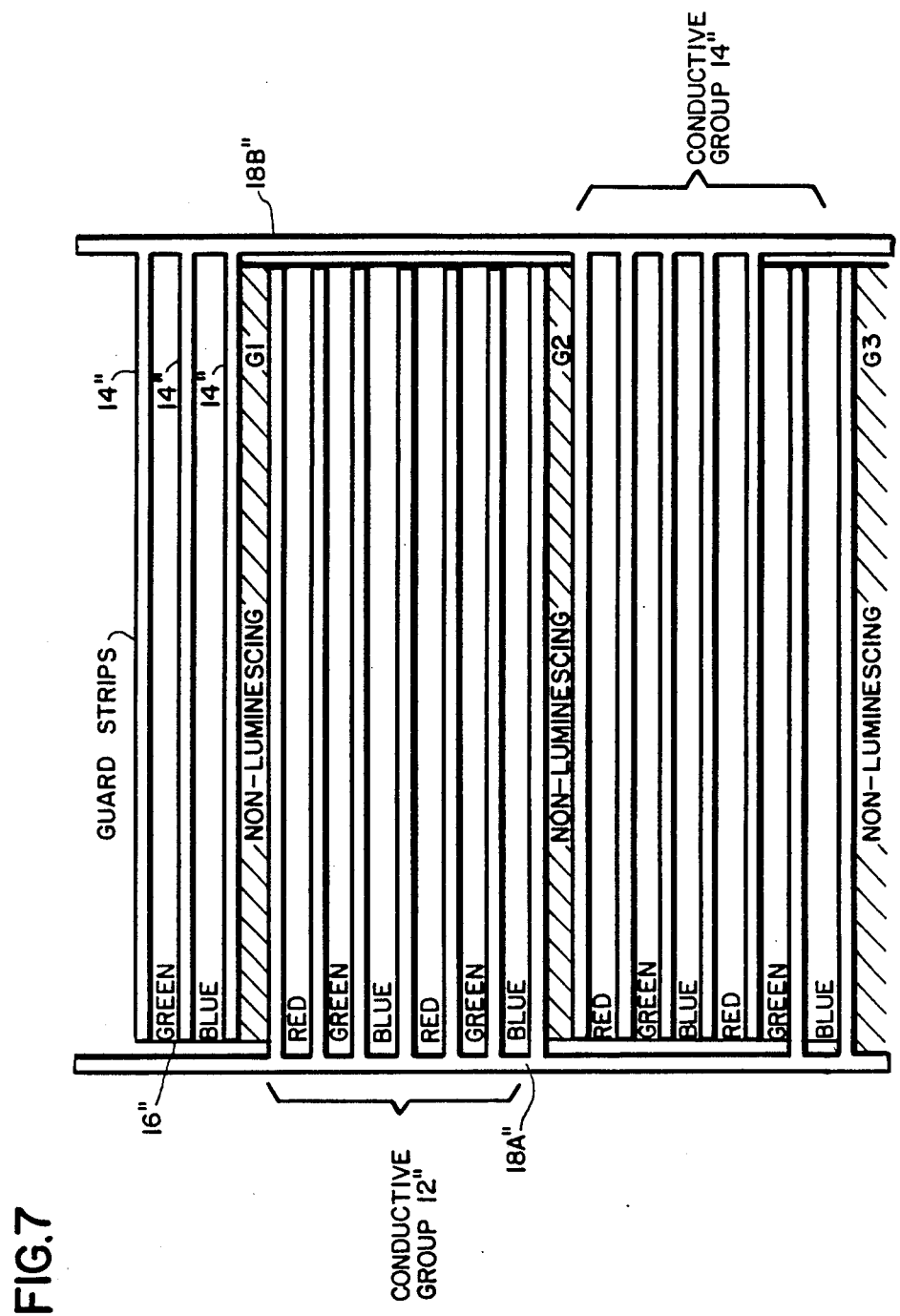

ELECTRON BEAM POSITION CONTROL FOR COLOR DISPLAY

BACKGROUND OF THE INVENTION

1. Field of the Invention

The present invention is directed generally to electron beam position control circuitry associated with cathode-ray tubes and, more particularly, to an arrangement wherein the vertical position of one or more scanning electron beams in a color display CRT is accurately controlled to maintain the beam (or beams) along a predetermined scanning path on a color phosphor.

2. Background Information

An arrangement for correcting the scanning position of multiple electron beams in a color television display tube is disclosed in U.S. Pat. No. 3,383,547 issued May 14, 1968. In the '547 patent, a number of sets of red, green and blue phosphor bars, wherein each set is separated by a conducting strip, are arranged on the face of a television receiving tube. In the tube, five collimated electron beams are produced for scanning of the tube, wherein the two outer electron beams are set to track along corresponding ones of the conducting strips, while the three inner electron beams scan a respective one of the red, green and blue phosphor bars. A modulation signal is imposed on one of the outer beams, and a corresponding signal of opposite phase is imposed on the other one of the outer beams. Accordingly, when the two outer beams each strike a conducting strip, no resultant signal is detected at a common conducting strip electrode. Should the collimated beams deviate from the desired scanning paths, an imbalance is detected with respect to the degree to which the two outer electron beams impinge on conducting strips, and a correction signal is applied to a vertical deflection circuit associated with the tube.

Other known arrangements wherein conductive strips or gratings are formed on the inner surface of a CRT face plate are shown in U.S. Pat. No. 2,739,260 issued Mar. 20, 1956, and U.S. Pat. No. 3,569,760 issued Mar. 9, 1971. A system wherein the instantaneous position of an electron beam is obtained during each horizontal line scan by the use of a series of vertically aligned conductive strips, is disclosed in an article entitled "An Electron Beam Indexing Colour Display System" by J. A. Turner, in Displays (British) (October 1979). All of these systems, however, are directed primarily to arrangements for enabling a single electron beam to produce a color television picture of suitable quality, and are not concerned with the vertical positional alignment of one or more electron beams during scanning in a cathode-ray tube.

SUMMARY OF THE INVENTION

An object of the invention is to provide an arrangement for controlling the position of one or more electron beams in a cathode-ray tube, so that the beams accurately track along predetermined paths on a light emitting phosphor in the tube.

Another object of the invention is to provide a beam position control arrangement for a cathode-ray tube having different color phosphors, wherein each of the phosphors are scanned accurately by one or more associated electron beams so as to produce a color picture of high quality.

Yet another object of the invention is to provide a beam position control arrangement for a color CRT, such that a shadow mask or aperture grill is not required, and the brightness obtainable from the tube is correspondingly increased.

According to the invention, an arrangement for controlling the position of a scanning electron beam in a cathode-ray tube, includes means for producing an electron beam of desired intensity, and means associated with the tube for deflecting the electron beam so that it scans substantially along a predetermined path on a phosphor coating in the tube. A series of spaced apart, horizontally disposed, parallel conductive strips are provided on the tube faceplate, wherein the gaps or spaces between the strips coincide with the predetermined scanning path of the electron beam. A predetermined pilot signal is modulated by suitable means on the electron beam, and a detecting means coupled to the conductive strips serves to detect the pilot signal in the event the electron beam deviates from the predetermined scanning path so as to impinge on one of the conductive strips by an amount greater than the beam impinges on an adjacent conductive strip along the predetermined path. Position correction means coupled to the detecting means and to the beam deflecting means operates to return the electron beam to the predetermined path in response to a position control signal produced by the detecting means.

The various features of novelty which characterize the invention are pointed out with particularity in the claims annexed to and forming a part of this disclosure. For a better understanding of the invention, its operating advantages and specific objects attained by its use, reference should be made to the accompanying drawing and descriptive matter in which there are illustrated and described preferred embodiments of the invention.

BRIEF DESCRIPTION OF THE DRAWINGS

FIG. 6 is a plan view of a portion of a color CRT face including guard strips between strips or bars of color phosphors in accordance with the FIG. 5 embodiment.

FIG. 7 is a plan view as in FIG. 6, showing non-luminescing lines at certain intervals.

DETAILED DESCRIPTION OF THE PREFERRED EMBODIMENT OF THE INVENTION

Figure 1:
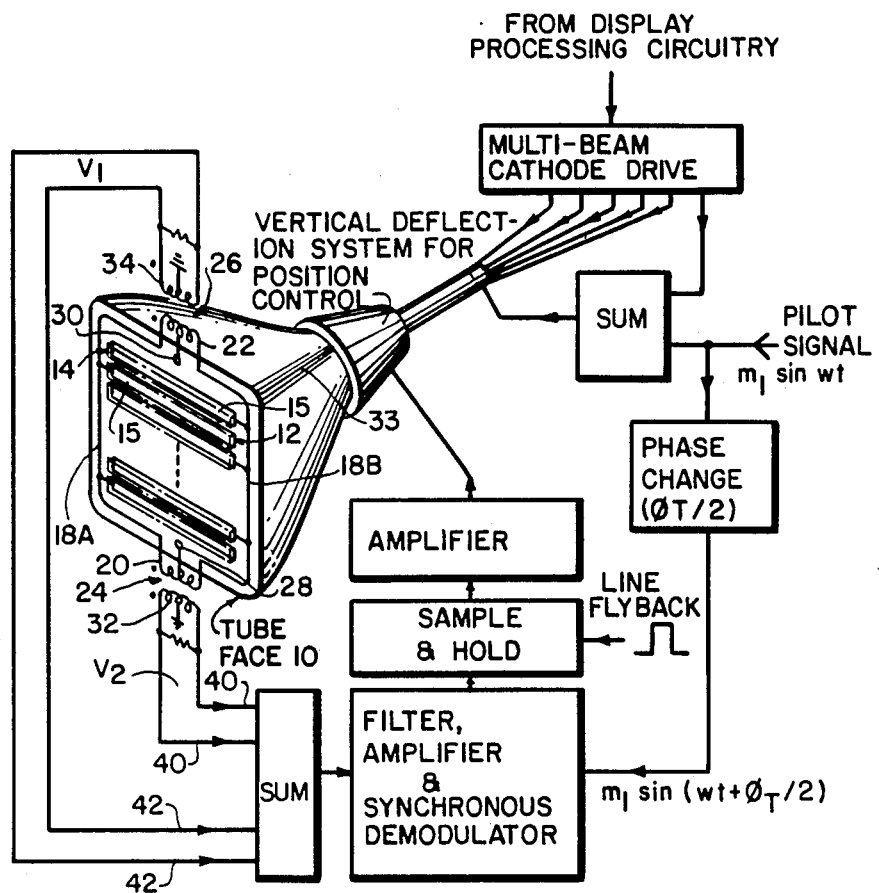
FIG. 1 is a block diagram of part of a color television receiving system, including a schematic representation of an embodiment of a beam position control arrangement according to the invention.
Figure 4:
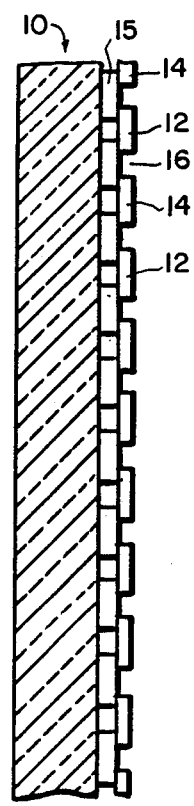
FIG. 4 is a partial perspective view of the face of the cathode ray tube showing color phosphors and conductive strips according to a first embodiment of the invention.

FIG. 1 shows part of the color television receiving system which includes an arrangement for controlling the position of an electron beam while scanning the face 10 of a cathode-ray tube (CRT), according to the invention. Specifically, two groups of spaced, horizontal conductive strips 12, 14 are arranged in a first vertical plane, adjacent a conventional group of phosphor strips 15 arranged in an immediately adjacent vertical plane, the latter being on the inner surface of the tube (FIG. 4). The strips 12 and 14 are provided in an interdigital configuration as seen. The strips 12 and 14 are parallel to one another and adjacent strips are spaced apart so as to form a relatively small gap 16. Each gap 16 coincides with the desired path of scan of the electron beam 33.

The conductive strips may be, for example, Indium Oxide or Tin Oxide, or a combination of such oxides, or other substantially transparent conductive materials. The preferred arrangement, for example, comprises interdigitated aluminum strips, or other substantially conductive and electron transparent material, positioned immediately behind light-emitting phosphors so that the electron beam passes through the conductive strips 12 and 14 before striking the light-emitting phosphors 15. Conductive edge contact strips 18A and 18B are arranged to connect corresponding ends of the sets of conductive strips 12,14 to primary, center-tapped windings 20, 22 of signal coupling transformers 24,26, respectively, as shown in FIG. 1.

As explained in detail below, the transformers 24,26 operate so as to (a) transform positional information signals, developed when the electron beam (FIG. 2) impinges on one of the conductive strips 12 by an amount greater than the beam impinges on an adjacent one of the conductive strips 14, into a corresponding position control signal, and (b) providing electrical isolation between a high voltage potential which may be applied to center-tap terminals 28,30 of the primary windings 20,22, respectively, and the ground reference of electronic processing circuitry coupled to center-tapped secondary windings 32,34 of the transformers 24,26, respectively. As shown in FIG. 1, the center-taps of the secondary windings 32,34 are each grounded.

Positioning of the electron beam 33 during a horizontal line scan, as viewed in FIG. 1, is controlled, in the vertical direction only, as follows:

The electron beam 33 is modulated in amplitude by a sinusoidal pilot signal $m_1 \sin wt$ as depicted in FIG. 1. It is thus clear from FIG. 1 that when the electron beam 33 falls on any of the conductive strips 12, a corresponding signal is induced in a part of the secondary windings 32, 34 so as to produce a signal in the form $m_2 \sin wt$ at secondary winding terminals 40,42, respectively. When the electron beam 33 impinges or falls on any of the conductive strips 14, a signal is produced at the secondary winding terminals 40,42 in the form of $-m_2 \sin wt$.

The signal $m_2 \sin wt$ after suitable demodulation and amplification is used to produce a downward vertical deflection of the electron beam 33, and the signal $-m_2 \sin wt$ is used to produce an upward vertical deflection of the electron beam 33. Accordingly, a stable vertical position for the electron beam 33 is possible only when a pilot current $m_1 \sin wt$ is divided substantially equally between adjacent ones of the conductive strips 12,14. That is, when the electron beam 33 impinges on adjacent strips 12,14 by equal amounts, the signals produced at the secondary winding terminals 40,42 become equal so that no net corrective vertical deflection is imposed on the scanning electron beam 33.

Figure 2:
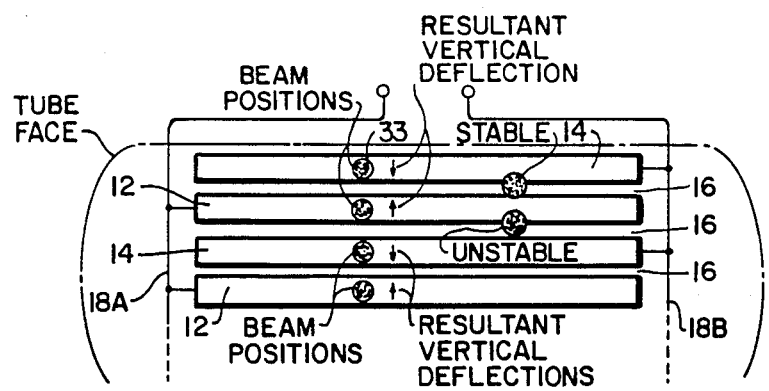
FIG. 2 is a schematic representation of a portion of the beam position control arrangament of FIG. 1 showing corrective positioning of electron beams.

FIG. 2 shows both stable and unstable equilibrium positions which result from the use of a pilot current of the form $m_1 \sin wt$. The stable and the unstable equilibrium positions will be interchanged if a pilot current of the form $-m_1 \sin wt$ is used. In a typical embodiment of the invention, it is contemplated that consecutive line scans will use phase reversal of the pilot current (i.e., $m_1 \sin wt$, $-m_1 \sin wt$, $m_1 \sin wt$, $-m_1 \sin wt$, etc.) thus allowing stable equilibrium of the vertical beam position to be achieved over consecutive gaps 16 between the conductive strips 12,14.

Vertical deflection of the electron beam 33, whether by magnetic or electrostatic means, will, in the typical embodiment, result from the synchronous demodulation of the transformer output signals $\pm m_2 \sin wt$. Synchronous demodulation is formed by multiplying the signal $\pm m_2 \sin wt$ by the sinusoidal pilot signal $m_1 \sin wt$, as follows:

$$m_1 \sin wt \times m_2 \sin wt = \frac{m_1 m_2}{2}(1 - \cos 2wt)$$

$$m_1 \sin wt \times -m_2 \sin wt = \frac{-m_1 m_2}{2}(1 - \cos 2wt)$$

Elimination of the high frequency component $\cos 2 wt$ by appropriate filtering leaves the base-band signal $$\pm \frac{m_1 m_2}{2}$$

available for vertical electron beam position control.

Vertical scanning of the electron beam 33 as it is swept across the tube face to produce a viewable picture, may be effected by (a) linear (analog) deflecting currents or voltages, or (b) non-linear (staircase) deflecting currents or voltages. In either of case (a) or case (b), the angular positioning of the deflection means would be such as to allow the electron beam 33 to scan during a scan line substantially parallel to the long edges of the conductive strips 12,14. This will minimize the control voltages or currents necessary for corrective vertical position control.

At the end of a horizontal scanning line, and while the electron beam 33 is under vertical position control, the control signal (e.g., the base-band signal $$\pm \frac{m_1 m_2)}{2}$$

is analog or digitally stored, so that after line flyback, the vertical error to be corrected would be minimized, thus allowing relatively fast movement of the electron beam 33 to a new stable vertical position.

With respect to the magnitude of the positional error signal, such signal may be defined as:

$$V_{PE} = \frac{V_{E\%}}{n} \times \frac{t_f}{t_s}$$

where $V_E\%$ is the vertical scanning error percentage, n is the number of horizontal scans per field scan, $t_f$ is the time for line flyback, and $t_s$ is the time for one horizontal scan including flyback.

Using typical values, $V_E\% = \pm 5\%$, n=50, and $t_f/t_s=0.2$. Then, $V_{PE}=\pm 1/50\%$ thus indicating that the required vertical correction or pull-in signal from line to line will be 1/5,000 of the peak to peak vertical scanning signal.

Figure 3:
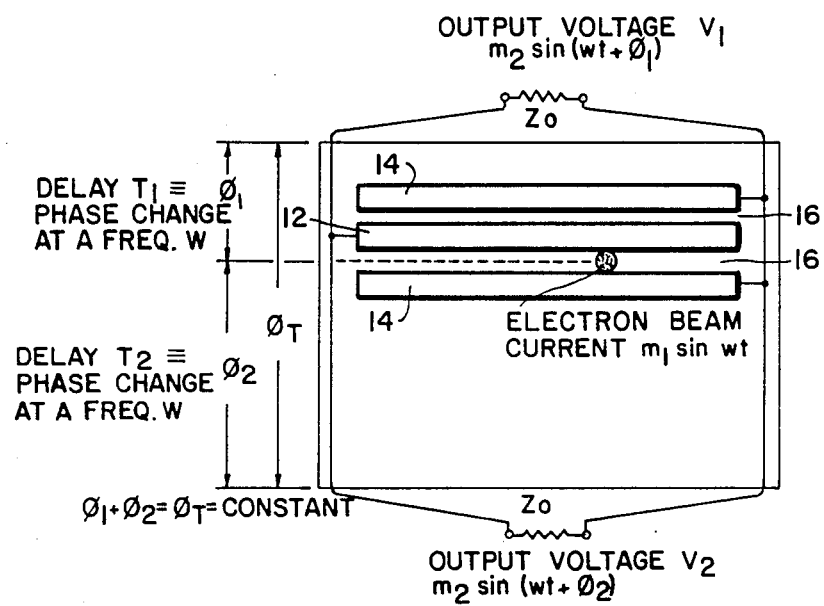
FIG. 3 is a schematic representation of a beam position control arrangement as in FIG. 1, illustrating phase delays and resultant output voltages produced in the arrangement.

The distributed inductance and capacitance of the interdigitated conductive strips 12,14 results in phase changes $\phi_1$ and $\phi_2$ of the modulated electron beam current $m_1$ sin wt as shown in FIG. 3. The effects of variable phases $\phi_1$ and $\phi_2$ can be minimized by adding together output voltages $V_1$ and $V_2$ as follows:

$$m_2 \sin(wt + \phi_1) + m_2 \sin(wt + \phi_2) =$$

$$2 \cos \frac{(\phi_1 - \phi_2)}{2} \sin\left(wt + \frac{\phi_T}{2}\right)$$

Since $\phi_T$ is constant, synchronous demodulation can be performed using a modified reference signal $m_1$ sin $$\left(wt + \frac{\phi_T}{2}\right)$$

thereby maximizing the composite output signal. Amplitude variability due to the term $$2 \cos \frac{(\theta_1 - \theta_2)}{2}$$

is a function of $$\frac{(\theta_1 - \theta_2)}{2}$$

which has a maximum value of $$\frac{\theta_T}{2}.$$

If the pilot frequency (maximum) is chosen so that $\phi_T = 120°$, the maximum variation of the amplitude term $$2 \cos \frac{(\theta_1 - \theta_2)}{2}$$

is 2:1, noting that cos 0=1 (when $\phi_1=\phi_2$), and cos (120/2)=0.5 (when $\phi_1=\phi_T$, $\phi_2=0$).

In this manner, a usable control signal amplitude can be obtained from the whole of the CRT tube face.

It will be understood, as shown in FIG. 3, that each of the output voltages, $V_1$ and $V_2$ must be terminated in the characteristic impedance ($Z_o$) of the interdigitated conductive strips 12,14, in order to prevent reflections from modifying the phase and amplitude of the output voltages.

Figure 5:
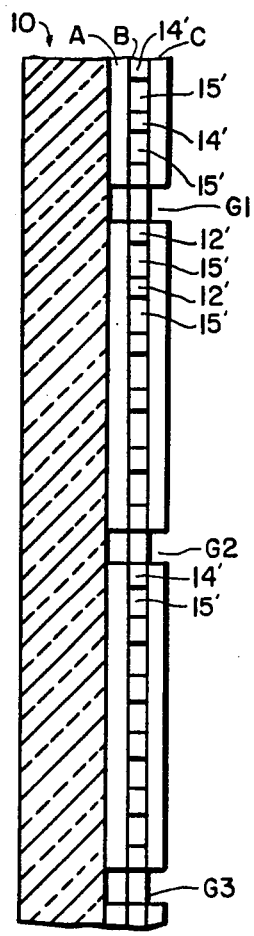
FIG. 5 is a vertical cross-section of the face of a cathode-ray tube showing color phosphors and conductive strips according to another embodiment of the invention.

FIG. 5 is a vertical cross-section of a CRT tube face for an alternate embodiment, illustrating three layers of horizontal conductive strips A, B and C which, individually or in combination, can be used to pick-up or detect one or more incident electron beams so as to provide positional information for correcting the position of the electron beams in the vertical direction. The combinations of the layers of interdigitated conductive strips suitable for such position control are: A, or B, or C, or [A and B], or [C and B]. It should be noted that: A consists of horizontal strips of substantially light transparent and electrically conducting material; B consists of alternate horizontal strips of phosphor and electrically conducting guard strips, the guard strips being substantially light-absorbing; C consists of horizontal strips of electrically conducting and substantially electron transparent material (for example: aluminum).

A preferred construction includes only the conductive guard strips in layer B, that is, the guard strips 14' between red, green and blue phosphors 15' in the case of a color CRT. Use of the guard strips in the layer B is advantageous for the following reasons:

(a) Fewer fabrication steps,
(b) Guard strips between the phosphors are necessary to prevent color desaturation as the electron beam spot diameter varies,
(c) The guard strips can be highly conductive as required, since they do not need to be transparent to visible radiations,
(d) The absence of the strip layers A and/or C leaves the viewed screen of the CRT symmetrical and without spatial differences other than the red, green and blue phosphor repeating lines.

Although the present invention may be applied to monochrome display systems wherein a CRT having a single electron beam is used for scanning a monochrome phosphor, as in the first embodiment of FIGS. 1-4, it will be appreciated that the invention may be gainfully applied to systems wherein multiple electron beams are used for color display systems such as, e.g., 3n electron beams wherein n is a positive integer. Specifically, in the case of a color graphics display system wherein six electron beams may scan two sets of three different colored phosphor lines simultaneously, the phosphor and guard strip layer B of FIG. 5 can appear as shown in FIG. 6. Rather than being connected alternatingly to conductive edge strips 18'a and 18'b the guard strips are arranged as interdigitated groups of strips wherein a conductive group 12' of six successive strips are each connected to the edge strip 18'a, and a second conductive group 14' of six successive strips are each connected to the edge strip 18'b. A particular color phosphor, for example: a blue phosphor, appears repeatedly in successive gaps 16' between adjacent conductive strips (guard strips). The number of conductive strips in a conductive group will, in the case of a color graphics system, consist of 3m strips where n=m and 3n electron beams are used in the CRT.

Gaps G1, G2, G3 etc. between adjacent conductive groups 12', 14' preferably should be associated with the least visible cathode luminescent phosphor (for example, a blue phosphor in the case of using red, green and blue phosphors for the display).

In the arrangement of FIG. 6, even numbered gaps G2, G4, G6, etc. will be associated with electron beams modulated by a pilot signal in the form $m_1$ sin wt, whereas intermediate or odd numbered gaps G1, G3, G5 etc. will be associated with electron beams modulated by a pilot signal of $-m_1$ sin wt. Such pilot signal modulations can exist during a single line scan, or consecutive line scans and may exist singly or in combination.

FIG. 7 shows another CRT face structure wherein guard strips between successive differently colored phosphors are arranged in conductive groups 12", 14" which groups are interdigitated and connected to corresponding edge strips 18A" and 18B". The arrangement of FIG. 7 is suitable for the presentation of alphanumeric characters, i.e., horizontal rows of characters separated by a non-light emitting horizontal strip. In FIG. 7, multiple triplets of red, green and blue phosphors are used to produce colored characters on the screen of the CRT. The non-luminescing strips, separating groups of RGB color phosphors, comprise gaps G1, G2, G3, etc. The gaps also separate the conductive groups 12", 14". Since the gaps are associated with an electron beam modulated only by a pilot signal, and since there is no light output from the non-luminescing strip, the pilot beam electron current may be significantly higher than that used in a color graphic display. Such feature significantly improves the signal-to-noise ratio.

The use of a pilot signal together with a video signal to be modulated on a scanning electrode beam, requires that a technique be available to detect the pilot signal in the presence of the video waveform. Assume a video waveform which consists of a pulse of constant width (t seconds), repeated every T seconds. The Fourier Transform of such waveform consists of spectral lines separated by 1/T Hz. Some of the spectral lines have zero amplitude, such lines being located at frequencies of 1/t Hz, 2/t Hz, 3/t Hz . . . etc. Therefore, any one of these frequencies can be used to locate the pilot frequency. For example, if the video waveform pulse has a duration of 0.1μs, the pilot frequency can be located at 10 MHz, or 20 MHz, or 30 MHz, etc.

Accordingly, in the case of a CRT color display system wherein multiple electron beams are used to scan phosphors of different colors, the position control system of the present invention will allow simultaneous illumination of, for example, triplets of red, green and blue phosphor lines so as to produce an accurate full color display.

It will be appreciated that the present system provides significant advantages over known methods of producing color displays, such as follows:

(a) Compared with shadow mask or aperture grill CRTs elimination of the shadow mask or aperture grill as in the present system allows a brightness factor increase of up to five times;

(b) compared with single gun beam indexing arrangements of the type which use vertically aligned phosphor strips, the present system employs horizontal strips, thus enabling improvement in brightness, no limitations on line scan linearity variations, no limitations on video signal rise and fall times, and no requirements or restrictions on picture element rates.

Many modifications and variations of the present invention as described herein will be apparent to those skilled in the art without departing from the spirit and scope of the present invention, as specifically defined in the appended claims.

I claim:

1. An arrangement for controlling the position of a scanning electron beam in a cathode-ray tube of the type having a light emitting phosphor coating on an inner surface of a face plate of the tube, comprising
    electron gun associated with the cathode-ray tube for producing an electron beam of desired intensity,
    deflecting means associated with the cathode-ray tube for deflecting the electron beam so that the electron beam scans substantially along a predetermined path on the phosphor coating, the phosphor coating emitting light the intensity of which corresponds to a condition of the electron beam at each point on the phosphor coating along which the electron beam scans,
    a series of spaced apart, horizontally disposed, parallel conductive strips adjacent the face plate of the tube, wherein the spaces between said conductive strips coincide with said predetermined path along which said electron beam is to be scanned,
    pilot signal means coupled to said electron gun means for modulating said electron beam with a predetermined pilot signal,
    detecting means, coupled to said conductive strips, for detecting said pilot signal and for producing a corresponding position control signal in the event said electron beam deviates from said predetermined path and impinges on one of said conductive strips by an amount greater than the electron beam impinges on an adjacent conductive strip along said predetermined path, said detecting means including means for producing oppositely phased signals in response to the respective impingements on said adjacent conductive strips, the position control signal being equal to the magnitude difference between said oppositely phased signals, and
    beam position correction means coupled to said detecting means and to said deflecting means for returning said electron beam to said predetermined path in response to said position control signal.

2. The arrangement according to claim 1, including first and second conductive edge contact strips on the face plate of the tube wherein said first edge contact strip connects corresponding ends of a first group of said parallel conductive strips to one another, and said second edge contact strip connects corresponding ends of a second group of said parallel conductive strips to one another, said first and said second edge contact strips forming means for connecting said parallel conductive strips to said detecting means.

3. The arrangement according to claim 2, wherein said first and said second group of parallel conductive strips are connected to said first and said second edge contact strips so as to be in interdigital relation with one another.

4. The arrangement according to claim 3, wherein each conductive strip of said first group is immediately adjacent a conductive strip of said second group.

5. The arrangement according to claim 1, wherein said detecting means includes a pair of transformers each comprising a center-tapped primary winding connected to said parallel conductive strips, and a secondary winding arranged to be connected to said beam position correction means.

6. The arrangement according to claim 1, wherein said pilot signal means is arranged to modulate said electron beam with a pilot signal in the form of $m_1 \sin wt$, wherein $m_1$ is a constant and w corresponds to a frequency which is substantially unoccupied by the spectral lines of video signals used to condition said electron beam to cause the phosphor coating on the tube to omit light.

7. The arrangement according to claim 6, wherein said beam position control means includes synchronous demodulation means for multiplying the position control signal from said detecting means by said pilot signal and providing a filtered base-band signal to said deflecting means for position correction of the electron beam.

8. The arrangement according to claim 3, wherein said electron gun means is operative to produce a plurality of electron beams, said deflecting means is arranged to deflect each of the electron beams for scanning a different one of a number of paths coincident with the spaces between said conductive strips, and the number of parallel conductive strips in each of said first and second groups is equal to the number of said electron beams produced by said electron gun means.

* * * * *